United States Patent [19]

Miyawaki et al.

[11] Patent Number: 6,121,378
[45] Date of Patent: Sep. 19, 2000

[54] THERMOSETTING POWDER PAINT COMPOSITION

[75] Inventors: Takahisa Miyawaki; Yoshio Kikuta; Mitsuyuki Mizoguchi; Hiroyuki Sakayama; Tsuyoshi Matsumoto, all of Kanagawa, Japan

[73] Assignee: Mitsui Chemicals, Inc., Japan

[21] Appl. No.: 09/136,290

[22] Filed: Aug. 19, 1998

[30] Foreign Application Priority Data

Aug. 21, 1997 [JP] Japan ..................................... 9-224957

[51] Int. Cl.$^7$ ....................................................... C08F 8/00

[52] U.S. Cl. ................................................................ 525/100

[58] Field of Search ..................................... 525/100, 476; 526/273

[56] References Cited

U.S. PATENT DOCUMENTS

| | | | |
|---|---|---|---|
| 4,877,837 | 10/1989 | Reising et al. | 525/100 |
| 5,854,350 | 12/1998 | Miyazoe et al. | 525/100 |
| 5,905,104 | 5/1999 | Eklund et al. | 523/435 |

*Primary Examiner*—Melvyn I. Marquis
*Attorney, Agent, or Firm*—Burns, Doane, Swecker & Mathis, L.L.P.

[57] ABSTRACT

A thermosetting powder paint composition for top coating excellent in weather resistance and storage stability, which comprising 100 parts by weight of an acrylic copolymer (A) having an epoxy group, and 0.01 to 2.0 parts by weight of an organic modified polysiloxane (B) containing at least one functional group, at least two silicon atoms and no radical-polymerizable unsaturated bond wherein the component (B) is contained in the condition that a part or all thereof has reacted and bonded with the component (A) or the component (C), or all thereof has not reacted with them.

19 Claims, No Drawings

THERMOSETTING POWDER PAINT COMPOSITION

BACKGROUND OF THE INVENTION

1. Field of the Invention

The present invention relates to a thermosetting powder paint composition, and more particularly, a thermosetting powder paint composition which can form a baked coating film having excellent external characteristics (eg. smoothness), physical properties (eg. mar resistance and recoating property), weather resistance, ultraviolet ray resistance, and chemical properties (eg. acid rain resistance and solvent resistance), and has excellent storage stability.

2. Description of the Related Art

Powder paints have a lot of merits such as low crisis of fire and poison and high workability, as compared with a solvent paint, and application field thereof has been recently enlarged. Among them, a thermosetting acrylic resin is regarded as promising from the viewpoints of gloss, weather resistance, chemical resistance and mechanical strength, and various investigations have been made for developing a thermosetting acrylic resin for a powder paint. As a conventional powder paint composition containing a thermosetting acrylic resin, there is generally used a composition prepared by compounding a thermosetting agent into an acrylic resin having a molecular weight of 1,000 to 30,000 which is a copolymer of an alkyl ester of acrylic acid or methacrylic acid with a glycidyl ester of acrylic acid or methacrylic acid (for example, DE-A Nos. 2,057,577 and 2,014,914). However, a coating film formed from this composition does not have satisfactory smoothness,,strength, chemical resistance and metal adherence.

There are also suggested a composition which provides a coating film having improved smoothness, prepared by compounding a cellulose derivative into a composition composed of an acrylic resin and a curing agent (for example, Japanese Patent Application Laid-Open (JP-A) No. 48-7,943), and a composition which provides a coating film having improved chemical resistance and adherence, prepared by compounding a polyvalent epoxy resin into a composition composed of an acrylic resin and a curing agent (for example, JP-A No. 48-17,844). However, coating films formed from powder compositions composed of these compositions do not satisfy in the point of strength.

Regarding the solvent paint, for example, JP-A No. 61-151,272 discloses a paint having high weather resistance which contains as a main resin component a graft polymer prepared by radical copolymerixzation of (A) a radical polymerizable compound mainly composed of a (meth) acrylate, (B) a radical-polymerizable silicone macro monomer, and (C) a cross-linkable monomer having a non-radical-polymerizable reactive functional group. However, since the silicone macro monomer of this paint is used in the graft polymer in high concentration (10 to 30% by weight), a coating film formed from this paint is poor in clear brilliance and recoating property while it is excellent in weather resistance and solvent resistance. Further, this paint having high weather resistance is a solvent type paint as is apparent from the formulation of a resin, curing agent and the like and simultaneously from the descriptions of examples. A solvent paint is not preferable in the viewpoints of atmosphere protection and resources saving as described below.

Recently, there are serious environmental problems such as air pollution, earth warming, acid rain and the like. Particularly, in the technical field of a paint, there occurs an air pollution problem when organic solvents generated in large amount in a painting process or a baking process are discharged into atmosphere, viewed from the standpoint of producers. On the other hand, there occurs a problem of the durability of a coating film when painted products are exposed to weather circumstances (eg. rain, snow, mist and smog), soil, sewage and the like which has been remarkably acidified, viewed from the standpoint of consumers. Further, when a solvent paint is used, an apparatus for closing system preventing leakage of organic solvents into atmosphere is required, therefore, the solvent paint is disadvantageous as compared with a powder paint which does not require such a large apparatus. Therefore, it is very effective to use a powder paint rather than a solvent paint from view points of environmental protection and resources saving, and transition from a solvent paint to a powder paint is tendency of the times.

However, in spite of increased demand for a powder paint due to such background, known powder paint technologies are problematical since a coating film formed by thermal setting is inferior in external characteristics (eg. smoothness and clear brilliance), physical properties (eg. impact resistance, adherence, mar resistance and re-coating property), weather resistance, ultraviolet ray resistance, and chemical properties (eg. acid rain resistance and solvent resistance), as compared with those in solvent paint technologies. Among these problems, acid rain resistance, solvent resistance and mar resistance are particularly problematical.

Regarding the powder paint technology, there is known a technology in which a thermosetting powder paint containing as a resin component an acrylic polymer having a glycidyl group and a dicarboxylic acid or polyvalent carboxylic anhydride as a curing agent is coated on a substrate (grounding), then cured thermally to form a coating film on the substrate (grounding), as disclosed, for example, also in U.S. Pat. No. 3,845,016 (Labana et at.) and U.S. Pat. No. 3,919,347 and JP-A No. 5-112,743, and the like. However, a cured coating film obtained by these technologies is inferior particularly in acid rain resistance, solvent resistance and mar resistance though it is excellent in external characteristics (smoothness).

For the purpose of solving the above-described problems of the known technologies, there has been made progress in investigation and development of another improving technology in which the surface of a coating film is modified by introducing a silicone compound having reactive functional groups such as a silanol group and alkoxysilyl group into a resin component of a powder paint composition, as disclosed, for example, in U.S. Pat. No. 4,877,837 (Reisin et al.). However, this powder paint composition is remarkably inferior in storage stability of a paint since a silanol group and an alkoxysilyl group having high reactivity exist in the silicone compound.

Further, Japanese Patent Application Publication (JP-B) No. 3-43,311 discloses a powder paint composition composed of a vinyl co-polymer of a glycidyl group-containing vinyl monomer, a silicon-containing vinyl-based monomer and the other monomers, and an aliphatic divalent acid. The silicon-containing vinyl monomer used in this composition is a compound which has a functional group (eg. an alkoxysilyl group) having high reactivity in addition to a vinyl-polymerizable unsaturated double bond, and has only one silicon atom in one molecule. A coating film obtained from this powder paint composition gives poor storage stability of a paint and poor acid rain resistance and solvent resistance of the coating film while gives excellent smoothness of the coating film, since the silicon-containing vinyl monomer has a functional group having high reactivity other than a unsaturated double bond, and the content of silicon per one molecule is low.

JP-A No. 09-505,847 discloses a technology regarding a powder paint suitable for painting a car body, wherein a specific epoxide group-containing polyacrylate resin is used as a binder. This powder paint is formed by using as a binder an epoxide group-containing polyacrylate resin obtained by polymerizing the following components (a) to (d).

(a) 10 to 50% by weight of an ethylene-based unsaturated monomer containing at least one epoxide group in the molecule or a mixture thereof, (b) 5 to 84.99% by weight of an aliphatic or alicyclic ester of (meth)acrylic acid or a mixture thereof, (c) 0.01 to 4.99% by weight of an ethylene-based unsaturated compound having statistically at least one polymerizable ethylene-based unsaturated group and at least two structural units represented by the general formula (—SiR$^1$R$^2$—O—) [R$^1$ and R$^2$ are the same or different and represents a C1 to C8 aliphatic or alicyclic group or a optionally substituted phenyl group] per one molecule, and (d) 5 to 84.99% by weight of an ethylene-based unsaturated monomer other than a, b and c, or a mixture thereof.

In the technology regarding a powder paint disclosed in JP-A NO. 09-505,847, it is a characteristic that an epoxide group-containing polyacrylate resin modified by copolymerizing an ethylenically unsaturated polysiloxane macro monomer with other vinyl monomer is produced as a resin-forming component constituting a powder paint composition.

In this technology, it is essential to use an ethylenically unsaturated polysiloxane macro monomer, and there is a disclosure that it is used when (1) a based paint colored is applied on the surface of a substrate, (2) a polymer coating film is formed from the paint applied in the step (1), (3) a transparent powder paint containing as a binder en epoxide group-containing polyacrylate resin is applied on the base coating film thus obtained, and subsequently (4) the base coating film is baked together with the transparent powder paint, for producing a two-layer coating film on the surface of a substrate using this powder paint. In this technology, though adherence between the base coat and the top coat when the powder paint is baked on onto the base coating film is excellent, re-coating property between top (clear) coats, namely relative adherence obtained when the powder paint is painted and baked, and the powder paint is further painted and baked on the resulted baked coating film is not necessarily excellent.

JP-B No. 3-45,111 discloses a thermosetting resin composition containing as essential components (A) 100 parts by weight of a thermosetting resin and (B) 0.01 to 10 parts by weight of a glycidyl group-containing silicone-based additive having a number average molecular weight of 150 or more having no vinyl-polymerizable unsaturated bond.

JP-B No. 4-70,331 discloses a method for producing a thermosetting resin for a powder paint, modified by a silicon-containing compound, wherein a thermosetting resin selected from a polyester, epoxy resin and vinyl polymer or a resin-forming component thereof is allowed to react with the silicon compound having no vinyl-polymerizable unsaturated bond in an amount from 0.01 to 30% based on the weight of the resin or resin-forming component.

In the technologies disclosed in JP-B Nos. 3-45,111 and 4-70,331, the storage stability (solid-phase reaction resistance) of the paint has been poor since a silane-based compound having high re-activity is used in the molecule of the silicon-containing compound though the appearance (smoothness) of the coating film is excellent, and improvement in acid resistance and mar resistance of the coating film has been insufficient since the content of silicon occupying one molecule is low.

JP-A 9-241,538 discloses a powder paint containing a silicone/acryl-graft copolymer as a main component in which an organopolysiloxane and an acrylic polymer are bonded in the form of a graft or block, wherein the side chain of the acrylic polymer in the co-polymer contains one or more groups selected from an epoxy group, hydroxyl group and carboxyl group, and the glass transition temperature is 45° C. or more.

This technology discloses the following points.

(1) a radical-polymerizable polysiloxane or an organopolysiloxane having a SH group in the molecule is selected as the organopolysiloxane, and the copolymer in the form of a graft or block is used.

(2) The amount used of the organopolysiloxane used is at least 5% by weight in the copolymer.

However, if an organopolysiloxane compound is used in the amount used as disclosed in this technology, the transparency and clear brilliance of a coating film in the case of clear coat becomes low, and the adherence of the coating film with a base-coat film and re-coating property between the top coats are poor.

EP-A No. 275,051 discloses a powder paint containing a polyacrylate resin produced by polymerizing as a binder an ethylene-based unsaturated monomer in the presence of a silicone resin. However, a large amount of the silicone resin herein described causes decrease in transparency and clear brilliance in the case of clear coat, decrease in adherence with a coating film and re-coating property between top coats.

When the above-described various problems are summarized, the conventional technologies regarding thermosetting powder paint compositions containing a silicone compound had any of the following problems (i) to (iv).

(i) When a silicone compound is used in large amount in producing a paint composition or a resin component, the transparency and clear brilliance of a coating film in the case of clear coat, and the adherence of the coating film with an under coating film and the re-coating property between top coating films are poor. An apparatus used for producing a paint composition and a resin composition is remarkably stained with a large amount of a silicone compound. Furthermore, the silicone compound which is remained in the apparatus gives bad effects to the other paint compositions and resin components, especially, it may reduce the appearance of the paint film.

(ii) A coating film tends to be repelled of rejected on a substrate (grounding) in producing the coating film, to form an incomplete coating.

(iii) It is difficult to manifest simultaneously excellent properties regarding the properties of a coating film such as external characteristics, physical properties, weather resistance, ultraviolet ray resistance and chemical properties.

(iv) The storage stability of a paint composition is poor.

SUMMARY OF THE INVENTION

An object of the present invention is to solve the above-described problems (i) to (iv) in the conventional powder paint technologies. Specifically, the object of the present invention is to provide a thermosetting powder paint composition for top coating which enables the following matters:
(i) Compatibility in preparing a paint composition is improved, and pollution in production is prevented,
(ii) The complete coating ability of a coating film on a substrate (grounding) is improved,
(iii) Excellent properties are simultaneously manifested regarding the properties of a coating film such as external characteristics (eg. smoothness and clear brilliance), physical properties (eg. mar resistance and recoating property), weather resistance, ultraviolet ray resistance, and chemical properties (eg. acid rain resistance and solvent resistance) of a coating film formed by thermosetting, and particularly, acid rains resistance, recoating property, solvent resistance and mar resistance are remarkably improved, and
(iv) The storage stability of a paint composition is improved.

The above-described object is accomplished by a thermosetting powder paint composition for top coating comprising:
   100 parts by weight of an acrylic copolymer (A) obtained by polymerization in a reaction system containing a monomer (a1) having at least one radical-polymerizable unsaturated bond and at least one epoxy group in one molecule and a monomer (a2) having at least one radical-polymerizable unsaturated bond and no epoxy group in one molecule, and
   0.01 to 2.0 parts by weight of an organic modified polysiloxane (B) having at least one functional group, at least two silicon atoms, and no radical-polymerizable unsaturated bond in one molecule,
   wherein the component (B) is contained in the condition that a part or all thereof has reacted and bonded with the component (A) or all thereof has not reacted with the component (A).

In contrast the with conventional technologies, the thermosetting powder paint composition of the present invention comprise, as a polysiloxane compound, an organic modified polysiloxane (B) having a functional group but no radical-polymerizable unsaturated bond, furthermore having at least two silicon atoms in one molecule, in the specific small amount.

By using the organic modified polysiloxane (B) having the specific structure in the specific small amount, the organic modified polysiloxane (B) can be uniformly crosslinked and kept in the whole cured coating film. As the result, there are obtained a cured coating film excellent in properties and the storage stability of a paint is not lost.

Before the coating film is cured, that is, when it is in the state of thermosetting powder paint composition, the organic modified polysiloxane (B) having the specific structure can be contained in the condition that all thereof has not reacted with the other components. Alternatively, the organic modified polysiloxane (B) can be contained in the condition that a part or all thereof has reacted and bonded with a resin component or the other components. Therefore, the amount of the organic modified polysiloxane (B) specified in the present invention, which is 0.01 to 2.0 parts by weight, includes the amount of the organic modified polysiloxane (B) bonding with them.

DESCRIPTION OF THE PREFERRED EMBODIMENTS

[Acrylic Copolymer (A)]

The acrylic copolymer (A) used in the present invention is a copolymer obtained by polymerization in a reaction system containing a monomer (a1) having at least one radical-polymerizable unsaturated bond and at least one epoxy group in one molecule and a monomer (a2) having at least one radical-polymerizable unsaturated bond and no epoxy group in one molecule.

[Monomer (a1)]

The monomer (a1) is not particularly restricted providing it is a monomer having at least one radical-polymerizable unsaturated bond and at least one epoxy group in one molecule. The epoxy group in the monomer (a1) remains even after formation of the acrylic copolymer (A), and effects crosslinking reaction with the functional group in the curing agent (C) to contribute to curing of a coating film.

Specific examples of the monomer (a1) include glycidyl (meth)acrylate, β-methylglycidyl (meth)acrylate, N-glycidyl (meth)acrylic acid amide, allylglycidyl ether, vinylsulfonic glycidyl, 3,4-epoxycyclohexyl (meth)acrylate, 4-hydroxybutyl (meth)-acrylate glycidyl ether. Among them, glycidyl (meth)acrylate is preferable, and glycidyl methacrylate is more preferable. They may be used alone or in combination of two or more.

[Monomer (a2)]

The monomer (a2) is not particularly restricted providing it is a monomer having at least one radical-polymerizable unsaturated bond and no epoxy group in one molecule. In general, it is preferable not to have such kind of reactive functional group as contributing to curing of a coating film by effecting crosslinking reaction with the reactive functional group in the curing agent (C).

Examples of the monomer (a2) include carboxylic acids, acid anhydride, carboxylates, unsaturated hydrocarbons, aromatic vinyl hydrocarbons, nitriles, amides, provided that they have a radical-polymerizable unsaturated bond. Among them, carboxylates having a unsaturated double bond are preferred.

Specific examples of such a monomer (a2) include (meth)acrylic acid derivatives such as methyl (meth)acrylate, ethyl (meth)acrylate, n-propyl (meth)acrylate, isopropyl (meth)acrylate, n-butyl (meth)-acrylate, isobutyl (meth)acrylate, hexyl (meth)acrylate, cyclohexyl (meht)acrylate, 2-ethylhexyl (meth)acrylate, octyl (meth)acrylate, 2-ethyloctyl (meth)acrylate, dodecyl (meth)acrylate, stearyl (meth)-acrylate, benzyl (meth)acrylate, phenyl (meth)acrylate, dimethylamino (meth)acrylate, isobornyl (meth)acrylate, tricyclodecanyl and (meth)acrylate; and esters of dicarboxylic acids such as maleic acid, fumaric acid and itaconic acid; amides such as (meth)acrylamide; α,β-unsaturated carboxylic acids or anhydrides thereof such as (meth)acrylic acid, maleic acid and maleic anhydride. They may be used alone or in combination of two or more.

Specific examples of the monomer (a2) include ethylenically unsaturated monomers, that are, aromatic vinyl hydrocarbons such as styrene, α-methylstyrene and vinyltoluene; halogenated ethylene-based unsaturated monomers such as vinyl chloride, vinylidene chloride, vinyl fluoride and monochlorotrifluoroethylene; nitriles such as (meth)acrylonitrile; aliphatic vinyl esters such as vinyl acetate; α-olefins such as ethylene, propylene and α-olefin having 4 to 20 carbon atoms; alkyl vinyl ether such as lauryl vinyl ether; and the like. They may be used alone or in combination of two or more.

The amounts used of the monomer (a1) and (a2) are preferably 15 to 60 parts by weight for the monomer (a1) and 40 to 85 parts by weight for the monomer (a2), more preferably 20 to 55 parts by weight for the monomer (a1) and 45 to 80 parts by weight for the monomer (a2), based on 100 parts by weight of the total weight of the monomer (a1)

and the monomer (a2). Use of the monomer (a1) in the above-described specific amount (preferably 15 parts by weight, more preferably 20 parts by weight) or more gives more excellent results particularly in the acid rain resistance, mar resistance and solvent resistance of the resulted coating film. On the other hand, use of the monomer (a1) in the above-described specific amount (preferably 60 parts by weight, more preferably 55 parts by weight) or less gives more excellent results in the smoothness, clear brilliance of the resulted coating film and the storage stability of the paint composition.

It is preferable that 39 to 55 parts by weight of portion of 45 to 80 parts by weight of the monomer (a2) is composed of a (meth)-acrylate having an alkyl group and/or cyclohexyl group having 1 to 12 carbon atoms. Use of such a (meth) acrylate in amount in the above-described range gives more excellent results in the points of hardness and weather resistance of a coating film.

When styrene is used as a part of the monomer (a2), the amount thereof is preferably from 1 to 30 parts by weight, and more preferably from 10 to 20 parts by weight, based on 100 parts by weight of the total weight of the monomer (a1) and the monomer (a2). In this case, the amount of the whole monomer (a2) is preferably from 40 to 85 parts by weight, more preferably from 50 to 80 parts by weight. The merit of use of styrene as a part of the monomer (a2) is that excellent gloss and smoothness can be further imparted to a coating film. Further, use of styrene in the above described specific amount (desirably 30 parts by weight, preferably 20 parts by weight) or less gives more excellent results in prevention of yellowing and weather resistance of the resulted coating film.

Further, in general, when conjugated dienes such as butadiene, nitrites such as acrylonitrile, or amides such as acrylamide are used as the monomer (a2) in a small amount, no problem occur in the points of coloration and weather resistance of a coating film. When a monomer having a group (eg. a carboxyl group, acid anhydride group and amino group) in the molecule which can react with an epoxy group is used in a small amount, no problem occur in the point of gelling in producing the acrylic copolymer component (A). Therefore, it is rather preferable that these monomers are used in a small amount [for example, 5 parts by weight or less based on the total weight of the monomer (a1) and the monomer (a2)] are used together with the other monomers (a2).

The acrylic copolymer (A) is preferably controlled so that the glass transition temperature (Tg) thereof is in the range from 30 to 100° C. Use of the acrylic copolymer (A) having a Tg of 30° C. or more usually gives more excellent results in the storage stability of a paint composition. On the other hand, used of the acrylic copolymer (A) having a Tg of 100° C. or less usually prevents lowering of flowability in heating and gives excellent results in external characteristics such as smoothness of the resulted coating film and the like derived from the prevention.

Tg of the acrylic copolymer (A) can be calculated according to the formula of Fox. The formula of Fox is used for calculating Tg of a copolymer based on Tg of homopolymers of monomers constituting the copolymer, and the detail thereof is described in Bulletin of the American Physical Society, Series 2, vol 1, No. 3, p. 123 (1956).

As Tg of various ethylenically unsaturated monomers which are a base for evaluating Tg of a copolymer according to the formula of Fox, values described in, for example, Shinkoubunshi Bunko, vol 7, Toryoyou Goseijushi Nyumon (Kyozo Kitaoka edit., Kobunshi Kankokai, Kyoto, 1974), pp. 168 to 169, tables 10-2 (Toryoyo Akurirujushlno Omona Genryotanryotai) can be adopted.

All of the descriptions should be a part of disclosure of the present specification since the literature and the scopes thereof are clearly cited. An ordinary skilled person can directly introduce the descriptions as a certain meaning from disclosure of the present specification with referring the scopes of the literature that are clearly cited.

The number average molecular weight (Mn) of the acrylic copolymer (A) is preferably from 1,000 to 10,000, and more preferably from 1,500 to 4,000. Use of the acrylic copolymer (A) having Mn of the above-described specific value (preferably 1,000, more preferably 1,500) or more gives more excellent results in the storage stability of a paint composition. On the other hand, use of the acrylic, co-polymer (A) having Mn of the above-described specific value (preferably 10,000, more preferably 4,000) or less gives more excellent results in external properties such as smoothness of the resulted coating film. For example, Mn of this acrylic copolymer (A) can be measured by GPC using styrene as a standard.

The acrylic copolymer (A) can be prepared by radical polymerization methods such as a solution polymerization method, emulsion polymerization method, suspension polymerization method and bulk polymerization method. Particularly, a solution polymerization is suitalbe.

As methods for controlling the molecular weight of the acrylic copolymer (A), there can be used means such as polymerization in the presence of a chain transfer agent of mercaptans such as dodecylmercaptan, disulfides such as dibenzoylsulfide, alkylesters having 1 to 18 carbon atoms of thioglycolic acid such as 2-ethylhexyl thioglycolate, halogenated hydrocarbons such as carbon tetrabromide; and an organic solvent having high chain transfer effect such as isopropyl alcohol, isopropylbenzene and toluene.

In the present invention, it is possible to use an organic modified polysiloxane-containing acrylic copolymer in which the organic modified polysiloxane (B) is previously dispersed in the acrylic copolymer (A), that is produced by adding the organic modified polysiloxane (B) into a reaction system for preparing the acrylic copolymer (A). For producing the organic modified polysiloxane-containing acrylic copolymer component, for example, the following methods are exemplified:

(1) The organic modified polysiloxane (B) is previously dissolved in a monomer component, and bulk polymerization or solution polymerization is conducted. In the case of a solution polymerization, an organic solvent is removed after the polymerization;

(2) After conducting the solution polymerization using an organic solvent, the organic modified polysiloxane (B) is added and uniformly dispersed in the solution, then, the organic solvent is removed; and the like. For example, in adding the organic modified polysiloxane (B) having a reactive functional group which can react with an epoxy group carried by the acrylic copolymer (A), it is necessary to appropriately select the reactive functional group, the amount of the functional group, the molecular weight and the like of the organic modified polysiloxane (B) so as not to generate a gelled substance which is not preferable for the production process.

[Organic Modified Polysiloxane (B)]

The organic modified polysiloxane (B) is not particularly restricted providing it is an organic modified polysiloxane having at least one functional group, at least two silicon atoms and no radical-polymerizable unsaturated bond in the molecule. Concretely, the functional group has reactivity to the acrylic copolymer (A) or the curing agent (C).

The organic modified polysiloxane (B) is preferably at least one compound represented by any of the following general formulae (I), (II), (III) and (IV):

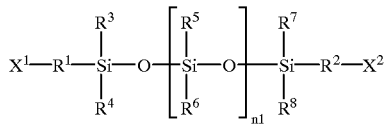

(I)

wherein the formula (I), $X^1$ and $X^2$ are a group represented by any of the following general formulae (a) to (f)

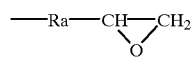

(a)

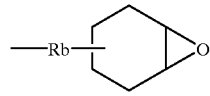

(b)

—Rc—COOH (c)

—Rd—OH (d)

—Re—NH$_2$ (e)

—Rf (f)

—H (g)

wherein formulae (a) to (f), Ra, Rb, Rc, Rd and Re represent a direct bond, alkylene group having 1 to 8 carbon atoms, phenylene group, alkylene group derivative, phenylene group derivative, or hydrocarbon group having an ether bond and/or ester bond, and Rf represents an alkyl group having 1 to 8 carbon atoms, phenyl group or derivative thereof,
$R^1$ and $R^2$ represent a direct bond, alkylene group having 1 to 8 carbon atoms, phenylene group or derivative thereof, $R^3$ to $R^8$ represent an alkyl group having 1 to 8 carbon atoms, phenyl group or derivative thereof, and n1 represents a number from 1 to 1,500,

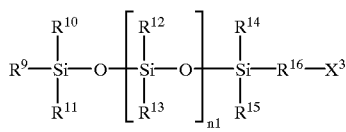

(II)

wherein the formula (II), $X^3$ is a group represented by any of the above-described general formulae (a) to (e), $R^9$ to $R^{15}$ represent an alkyl group having 1 to 8 carbon atoms, phenyl group or derivative thereof, $R^{16}$ represents a direct bond, alkylene group having 1 to 8 carbon atoms, phenylene group, alkylene group derivative, phenylene group derivative, or hydrocarbon group having an ether bond and/or ester bond, and n2 represents a number from 1 to 1,500,

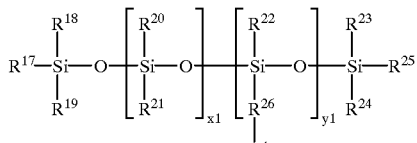

(III)

wherein the formula (III), $X^4$ is a group represented by any of the above-described general formulae (a) to (e), $R^{17}$ to $R^{25}$ represent an alkyl group having 1 to 8 carbon atoms, phenyl group or derivative thereof, $R^{26}$ represents a direct bond, alkylene group having 1 to 8 carbon atoms, phenylene group, alkylene group derivative, phenylene group derivative, or hydrocarbon group having an ether bond and/or ester bond, x1 represent a number from 1 to 1,300, and y1 represents a number from 1 to 200,

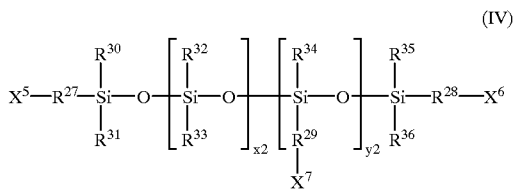

(IV)

wherein the formula (IV), $X^5$, $X^6$ and $X^7$ are a group represented by any of the above-described general formulae (a) to (e), $R^{30}$ to $R^{36}$ represent an alkyl group having 1 to 8 carbon atoms, phenyl group or derivative thereof, $R^{27}$ to $R^{29}$ represent a direct bond, alkylene group having 1 to 8 carbon atoms, phenylene group, alkylene group derivative, phenylene group derivative, or hydrocarbon group having an ether bond and/or ester bond, x2 represent a number from 1 to 1,300, and y2 represents a number from 1 to 200.

Further concretely, the organic modified polysiloxane (B) is preferably a compound represented by any of the following general formulae (V) to (XXVIII):

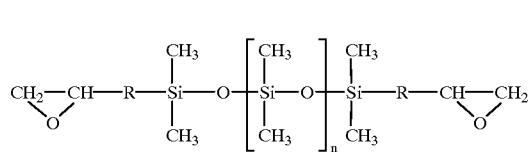

(V)

-continued
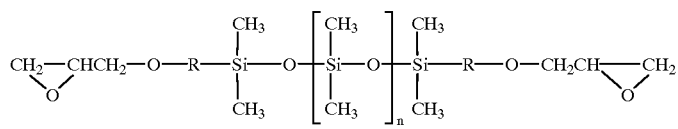 (V')
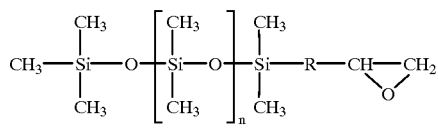 (VI)
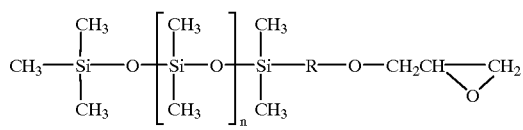 (VI')
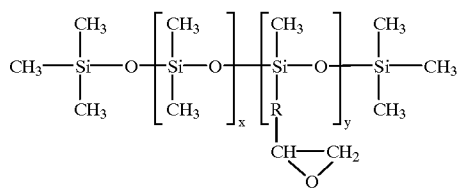 (VII)
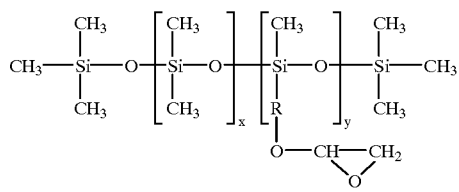 (VII')
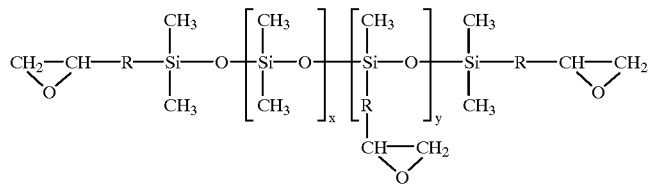 (VIII)
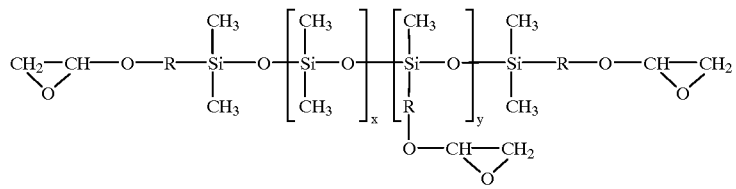 (VIII')
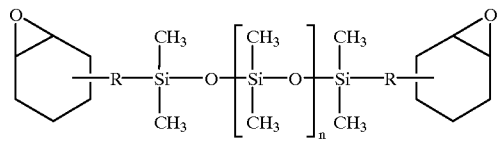 (IX)
(X)

-continued
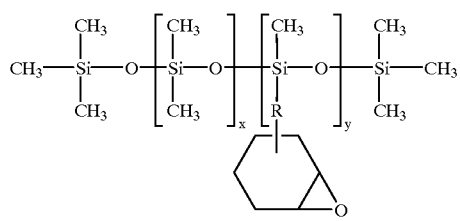 (XI)
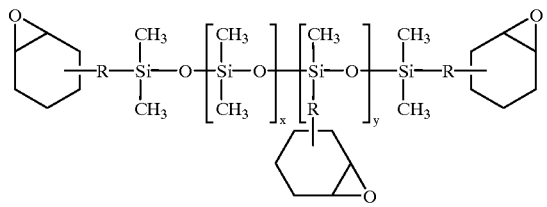 (XII)
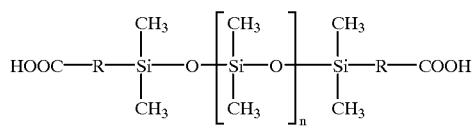 (XIII)
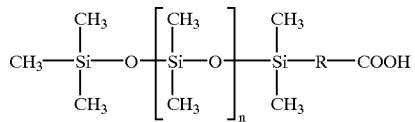 (XIV)
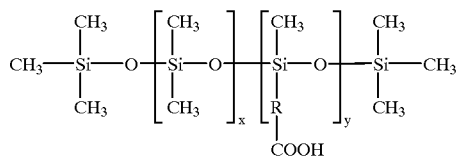 (XV)
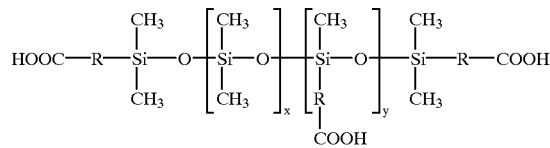 (XVI)
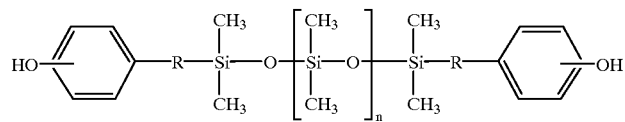 (XVII)
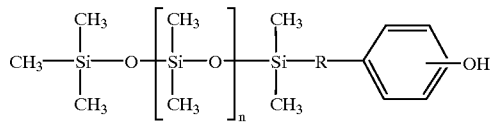 (XVIII)

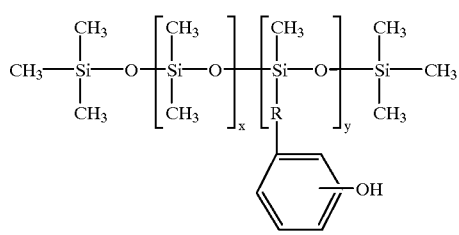
(XIX)
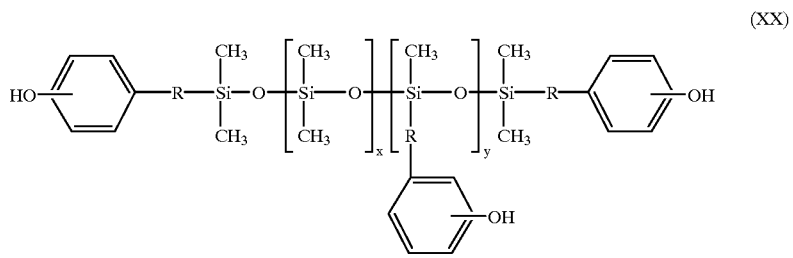
(XX)
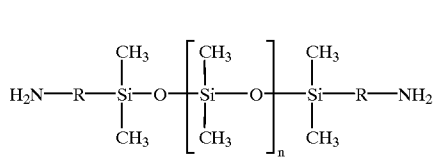
(XXI)
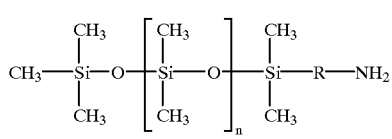
(XXII)
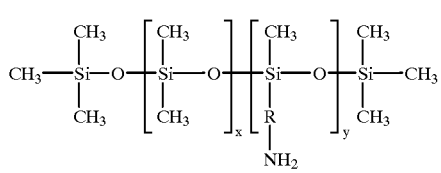
(XXIII)
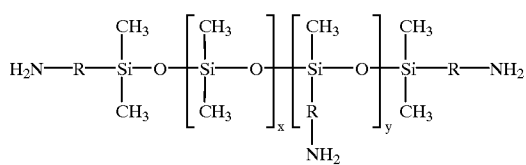
(XXIV)
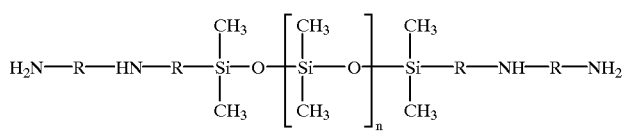
(XXV)
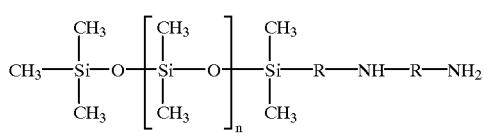
(XXVI)

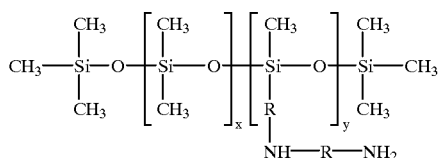

(XXVII)

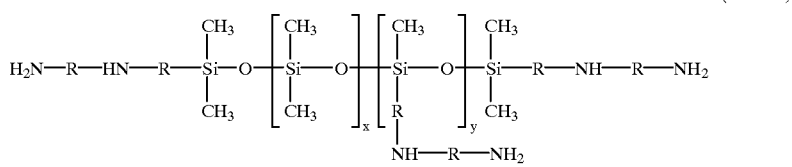

(XXVIII)

wherein the formulae (V) to (XXVIII), R each independently represents a direct bond, alkylene group having 1 to 20 carbon atoms, phenylene group, alkylene group derivative, phenylene group derivative, or hydrocarbon group having an ether bond and/or ester bond, n each independently represents a number from 1 to 1,500, x each independently represents a number from 1 to 1,300, and y each independently represents a number from 1 to 200.

$R^3$ to $R^8$ in the general formula (I), $R^9$ to $R^{15}$ in the general formula (II), $R^{17}$ to $R^{25}$ in the general formula (III) and $R^{30}$ to $R^{36}$ in the general formula (IV) are hydrocarbon groups including an alkl group having 1 to 8 carbon atoms, phenyl group and derivative thereof. Among them, a phenyl group and methyl group are preferred, and a methyl group is more preferred.

The ranges of repeating unit (n1, n2, x1+y1, x2+y2) in the general formulae (I) to (IV) are as defined in the formulae. The lower limit of the ranges are preferably 10, more preferably 100, most preferably 500.

The organic modified polysiloxane represented by any of the general formulae (V) to (XII) has, preferably, an epoxy equivalent from 200 to 5,000. The organic modified polysiloxane represented by any of the general formulae (XIII) to (XVI) has, preferably, a carboxyl equivalent from 500 to 5,000. The organic modified polysiloxane which is modified represented by any of the general formulae (XVII) to (XX) has, preferably, a —OH equivalent from 1,000 to 5,000. The organic modified polysiloxane represented by any of the general formulae (XXI) to (XXVIII) has, preferably, a —$NH_2$ equivalent from 500 to 10,000.

As commercially available products of the organic modified polysiloxane (B) represented by the general formula (I), examples thereof in which $X^1$ and $X^2$ are a group represented by the general formula (a) include both terminals epoxy modified dimethylpolysiloxanes such as BY16-855, BY16-855B (above-described marks are trade names, manufactured by Dow Corning Toray Silicone Co., Ltd.), RF-105, X-22-163A, X-22-163B, X-22-163C (above-described marks are trade names, manufactured by Shin-Etsu Chemical Co., Ltd.).

Examples the organic modified polysiloxane (B) in which $X^1$ and $X^2$ are a group represented by the general formula (b) include both terminals alicyclic epoxy modified dimethylpolysiloxanes such as X-22-169AS, X-22-169B (above-described marks are trade names, manufactured by Shin-Etsu Chemical Co., Ltd.).

Examples the organic modified polysiloxane (B) in which $X^1$ and $X^2$ are a group represented by the general formula (c) include both terminals carboxyl modified dimethylpolysiloxanes such as BY16-750 (trade name, manufactured by Dow Corning Toray Silicone Co., Ltd.), X-22-162A, X-22-162C (above-described marks are trade names, manufactured by Shin-Etsu Chemical Co., Ltd.), and the like.

Examples the organic modified polysiloxane (B) in which $X^1$ and $X^2$ are a group represented by the general formula (d) include both terminals phenol modified dimethylpolysiloxanes such as BY16-752 (trade name, manufactured by Dow Corning Toray Silicone Co., Ltd.), X-22-169B (trade name, manufactured by Shin-Etsu Chemical Co., Ltd.).

Examples the organic modified polysiloxane (B) in which $X^1$ and $X^2$ are a group represented by the general formula (e) include both terminals amino modified dimethylpolysiloxanes such as BY16-853, BY16-853B(above-described marks are trade names, manufactured by Dow Corning Toray Silicone Co., Ltd.), X-22-161AS, X-22-161A, X-22-161B, KF-8012 (above-described marks are trade names, manufactured by Shin-Etsu Chemical Co., Ltd.).

As commercially available products of the organic modified polysiloxane (B) represented by the general formula (II), examples the organic modified polysiloxane (B) in which $X^3$ is a group represented by the general formula (a) include one terminal epoxy modified dimethylpolysiloxanes such as X-22-173DX (trade name, manufactured by Shin-Etsu Chemical Co., Ltd.).

As commercially available products of the organic modified polysiloxane (B) represented by the general formula (III), examples the organic modified polysiloxane (B) in which $X^4$ is a group represented by the general formula (a) include side chain epoxy modified dimethylpolysiloxanes such as SF8411, SF8413 (above-described marks are trade names, manufactured by Dow Corning Toray Silicone Co., Ltd.), KF-1001, KF-101 (above-described marks are trade names, manufactured by Shin-Etsu Chemical Co., Ltd.).

Examples the organic modified polysiloxane (B) in which $X^4$ is a group represented by the general formula (b) include side chain alicyclic epoxy modified dimethylpolysiloxanes such as BY16-839 (trade name, manufactured by Dow Corning Toray Silicone Co., Ltd.), KF-102 (trade name, manufactured by Shin-Etsu Chemical Co., Ltd.).

Examples the organic modified polysiloxane (B) in which $X^4$ is a group represented by the general formula (c) include side chain carboxyl modified dimethylpolysiloxanes such as SF8418 (trade name, manufactured by Dow Corning Toray Silicone Co., Ltd.), X-22-3701E (trade name, manufactured by Shin-Etsu Chemical Co., Ltd.).

Examples the organic modified polysiloxane (B) in which $X^4$ is a group represented by the general formula (e) include side chain amino modified dimethylpolysiloxanes such as BY16-828, BY16-859 (above-described marks are trade names, manufactured by Dow Corning Toray Silicone Co., Ltd.), KF-864, KF-865, KF-868, KF8003 (above-described marks are trade names, manufactured by Shin-Etsu Chemical Co., Ltd.).

In usual, the weigh average molecular weight of the organic modified polysiloxane (B) is preferably from 500 to 100,000, and more preferably from 1,000 to 90,000. When the weigh average molecular weight of the organic modified polysiloxane (B) is in the above-described range, the resulting coating film has excellent appearance, and the mar resistance, acid resistance re-coating property of the coating film are excellent.

[Action and Mechanism of Organic Modified Polysiloxane (B)]

The action and effect of the organic modified polysiloxane (B) in the thermosetting powder paint composition used in the present invention are guessed as follows.

By reacting the reactive functional group in the organic modified polysiloxane (B) with the reactive functional group in the acrylic copolymer (A) or the curing agent (C) with the aid of heat, a cured coating film is formed in which an organic modified polysiloxane (B) is uniformly kept in the film is obtained. Because of the properties of the polysiloxane, the crosslinked coating film is excellent in, particularly, solvent resistance, acid resistance and mar resistance. Since the organic modified polysiloxane (B) is taken into three-dimensional network structure due to curing with heating, compatibility thereof is maintained, and extreme localization of a polysiloxane skeleton on the surface of a coating film are prevented.

Further, when the reactive functional group in the organic modified polysiloxane (B) conducts crosslinking reaction with the acrylic copolymer (A) or the curing agent (C) and is taken into three-dimensional network structure in temperature increase in baking, inner plasticization occurs, the melt viscosity of a paint decreases, and the smoothness of a coating film is improved.

When there is used a polysiloxane having no functional group which can react with the reactive functional group in the acrylic co-polymer (A) or the curing agent (C), the compatibility of the polysiloxane with the acrylic copolymer (A) or the curing agent (C) is insufficient at the time of heat curing because the polysiloxane has no functional group which can react with the reactive functional group in the acrylic copolymer (A) or the curing agent (C). Therefore, appearance (transparency and smoothness) of clear coating, solvent resistance and recoating property of the resulting coating film decrease, though it has excellent acid resistance.

[Amount Used of Organic Modified Polysiloxane (B)]

The amount used of the organic modified polysiloxane in the thermosetting powder paint composition of the present invention is preferably from 0.01 to 2.0 parts by weight based on 100 parts by weight of the acrylic copolymer (A). When the amount is over 2.0 parts by weight, there is tendency that the resulting coating film is opaque and transparency and clear brilliance decrease. When the amount is less than 0.01 part by weight, improve in the acid resistance and mar resistance of the resulting coating film becomes insufficient. The amount is preferably from 0.01 to 1.0 parts by weight.

[Curing Agent (C)]

The curing agent (C) used in the present invention is preferably composed of at least one polyvalent carboxylic acid-based compound selected from the group consisting of a polyvalent carboxylic acid (c1) and a polyvalent carboxylic anhydride (c2). Examples of the polyvalent carboxylic acid (c1) and the polyvalent carboxylic anhydride (c2) will be described below.

[Polyvalent Carboxylic Acid (c1)]

As the polyvalent carboxylic acid (c1), any of aliphatic, aromatic and alicyclic compounds can be used. As specific examples of the aromatic polyvalent carboxylic acid, for example, isophthalic acid, trimellitic acid are listed, and they may be used alone or in combination. As specific examples of the alicyclic polyvalent carboxylic acid, for example, hexahydrophthalic acid, tetrahydrophthalic acid are listed, and they may be used alone or in combination. Further, polyester resins and the like having a carboxyl group can also be used.

In the present invention, use of the aliphatic polyvalent carboxylic acid is preferable in the points of the properties of a coating film such as smoothness and weather resistance.

The concept of the term "aliphatic" used in the present specification include not only aliphatic in a narrow sense but also alicyclic having substantially low aromatic content. Namely, the concept of this term "aliphatic" compound include also a group of compounds having substantially low aromatic content, containing in the molecule a divalent hydrocarbon atom containing at least one carbon atom, specifically, not only aliphatic groups in a narrow sense but also alicyclic groups having substantially low aromatic content, groups obtained by combination thereof, or also a group of compounds containing in the molecule a divalent residue in which these are bonded by a hydroxyl group, nitrogen, sulfur, silicon, phosphorus and the like, more specifically, also a group of compounds containing in the molecule a moiety obtained by substituting the above-described groups with an alkyl group, cycloalkyl group, allyl group, alkoxyl group, cycloalkoxyl group, allyloxyl group, halogen (eg. F, Cl and Br) group and the like. By suitable selection of these substituents, various properties (eg. heat resistance, toughness, decomposing property and strength) of the copolymer used in the present invention can be controlled. The concept of the term "aliphatic" used in the present specification include not only one kind of compound but also combination of two or more compounds.

Examples of this aliphatic polyvalent carboxylic acid will be described.

The aliphatic polyvalent carboxylic acid is not particularly restricted providing it is an aliphatic compound having substantially at least two carboxyl groups in the molecule, and one or more of them can be used. Especially, aliphatic dicarboxylic acids having 8 to 20 carbon atoms are preferred.

Specific examples of aliphatic dicarboxylic acids include sebacic acid, undecanedioic acid, dodecanedioic acid, brassilic acid, eicosanedioic acid and octadecanedioic. Among them, sebacic acid, dodecanedioic acid, brassilic acid and eicosanedioic acid are preferable, and dodecanedioic acid is more preferable. They may be used alone or in combination.

When aromatic content increases, the properties of a coating film such as smoothness, impact resistance and weather resistance deteriorate.

[Polyvalent Carboxylic Anhydride (c2)]

The concept of terms "anhydride", "anhydride group", "anhydride bond" and "polyanhydride" used in the present specification also include concepts regarding words described in the clause "polyanhydride" in "MAZUREN polymer large dictionary—Concise Encyclopedia of Polymer Science and Engineering (Kroschwitz ed., Wataru Mita supervised and translated, MARUZEN, Tokyo, 1994)" pp. 996 to 998. The concepts of terms "acid anhydride" and "anhydride" used in the present specification are mutually equivalent concepts, and the concepts of terms "acid anhydride" and "anhydride" used in the specification of the instant application also include concepts described in the clause "acid anhydride" described in Chemical Large Dictionary vol. 3 (published by Kyoritsu publication, 1963), pp. 996 left column to 997 right column.

In the present invention, liner aliphatic polyvalent carboxylic anhydrides are preferred from the viewpoint of crosslinking effect and the like. Examples of this polyvalent carboxylic anhydride will be described below.

The aliphatic polyvalent carboxylic anhydride is a linear dimer or more, oligo or poly-aliphatic acid anhydride substantially having in the molecule a carboxyl group or no carboxyl group, and is not particularly restricted providing it is a compound having at least two carboxyl groups and/or acid anhydride groups substantially existing in the molecule, and one or two or more them can be used.

In the specification of the instant application, the concept of the term "linear" include not only liner but also the case in which a liner dimer or more, oligo or poly-aliphatic acid anhydride forms a macrocycle performing the same effect as a linear compound.

As an example of the aliphatic polyvalent carboxylic anhydride, a liner polycondensate is listed obtained by dehydration condensation of one or two or more aliphatic dicarboxylic acids. For example, the liner polycondensate obtained by dehydration condensation of one aliphatic dicarboxylic acid, are represented by the following general formula.

wherein m is a narutal number of 1 or more, n is a natural number of 2 or more, and preferably, m is not more than 30).

As specific examples of the linear aliphatic dicarboxylic anhydride (c2), linear dehydrated condensates of the above-described aliphatic polyvalent carboxylic acid (c1) are listed. Among them, a linear dimer or more, oligo or poly-aliphatic acid anhydride of at least one compound selected from the group consisting of sebacic acid, dodecanedioic acid, brassilic acid and eicosanedioic acid is preferable, and a linear dehydrated condensated of dodecanedioic acid is more preferable.

As other specific examples of the polyvalent carboxylic anhydride (c2), modified polyacidanhydrides such as dicarboxylic (poly)-anhydrides modified with a polyisocyanate described in EP-A No. 695,771, polyol-modified polymer polyacidanhydrides described in EP-A No. 299,420 also can be suitably used.

As the polyvalent carboxylic anhydride (c2), commercially available polyvalent carboxylic anhydrides can also be suitably used. As specific examples of these commercially available polyvalent carboxylic anhydrides "Additol VXL1381" (trade name, manufactured by Vianova Resins GmbH), "PS-AH" (trade name, manufactured by Okamura Seiyu K.K.) are listed.

The polyvalent carboxylic anhydride (c2) is preferably controlled so that the melting point thereof is in the range from 40 to 170° C. When the melting point of the polyvalent carboxylic anhydride (c2) is in the above-described range, appearance of a coating film is excellent, and at the same time, blocking property of a powder paint is excellent.

[Crosslinking Bond Formation by Aliphatic Dicarboxylic Anhydride]

When a cyclic anhydride of a polyvalent carboxylic acid such as succinic anhydride and phthalic anhydride is reacted with an epoxy group in the acrylic copolymer (A) component, effect for crosslinking a plurality of the acrylic copolymer (A) molecules is low, since the anhydride has high possibility to be reacted only with an epoxy ring of a specific glycidyl group of the (a2) molecule.

On the other hand, when a (co)polycondensate of an aliphatic dicarboxylic acid is reacted with en epoxy group, the chemical properties of a coating film such as solvent resistance, acid resistance and the like are improved, since the (co)polycondensate is cleaved at anhydride group portion to form a plurality of fragments, and all of them are reacted with epoxy groups in separate acrylic copolymers (A), and effect for crosslinking a plurality of acrylic copolymers (A) is manifested.

[Amount Used of Curing Agent (C)]

The amount used of the curing agent (C) is preferably from 5 to 60 parts by weight, and more preferably from 15 to 50 parts by weight based on 100 parts by weight of the acrylic copolymer (A).

Regarding equivalent ratio, the total equivalent of functional group (carboxyl group and/or acid anhydride) in curing agent (C) per one equivalent of epoxy group in the acrylic copolymer (A) is preferably from 0.5 to 1.5 equivalent, and more preferably from 0.7 to 1.2 equivalent.

When the amount of curing agent (C) or the equivalent ratio of functional group in the curing agent (C) is in the above-described range, the properties of a coating film such as appearance, solvent resistance and mar resistance are improved.

[Melting Point of Curing Agent (C)]

The melting point of curing agent (C) is preferably from 40 to 170° C. Use of the curing agent (C) having a melting point of 40° C. or more, gives more excellent results in the storage stability of a powder paint. On the other hand, used of the curing agent (C) having a melting point of 170° C. or less, gives more excellent results in flowability with heating in baking of a paint, the smoothness of the resulted coating film and the like.

[Additives]

In the method of the present invention, various additives usually added to a paint are added.

That is, a synthetic resin composition such as an epoxy resin, polyester resin and polyamide; a natural resin or semisynthetic resin composition such as fibrin and fibrin derivative can be suitably compounded, according to the object, to the thermosetting powder paint composition of the present invention to improve the appearance or physical properties of a coating film.

To the thermosetting powder paint of the present invention, additives such as a curing catalyst, pigment, leveling agent, thixotropy regulator, static charge regulator, surface regulator, gloss agent, blocking inhibitor, plasticizer, ultraviolet ray absorber, inflation inhibitor (degassing agent), coloration inhibitor and anti-oxidant may also be appropriately compounded according to the object. Further, a small amount of pigment may be compounded in the case of use of a clear coat, for coloration to an extent wherein opacifying effect is not completely manifested.

Ordinary, the term "powder paint composition" means a composition which is containing the curing agent (c) and is used for powder paint as it is. However, the "powder paint composition" of the present invention include not only such composition, but also resin component for powder paint which is a material before being added curing agent (c).

A method for producing the thermosetting powder paint composition of the present invention (compounding method of a composition) is not particularly restricted proving it is a method which can compound the acrylic copolymer (A), organic modified polysiloxane (B) and curing agent (C) so as to obtain desired ratio, and known or public-used methods can be adopted. For enhancing dispersing property of the organic modified polysiloxane (B) component, there can also be adopted a method in which the organic modified polysiloxane (B) is previously dispersed in the acrylic copolymer (A) or curing agent (C) component by melting.

As specific examples of the method for producing the thermosetting powder paint composition of the present invention, there are listed methods in which kneading machines such as a roll, kneader, mixer (eg. Banbury type and transfer type), calender apparatus and extruder are appropriately combined, conditions for processes (temperature, melt or non-melt, rotation, vacuum atmosphere and inert gas atmosphere) are appropriately set, and fully uniform mixing is conducted. Thereafter, a powder paint in the form of a uniform fine powder can be obtained using a grinding machine and the like. However, the present invention is not limited to them.

Further, as an embodiment of the compounding and kneading process in which additives and the like are added to the thermosetting power paint composition of the present invention, if additives such as a blocking inhibitor, surface regulator, plasticizer, static charge regulator, pigment, filler and thickening agent are optionally added to the acrylic copolymer (A), organic modified polysiloxane (B) and curing agent (C), and then they are sufficiently melted and kneaded by a melting and kneading apparatus at a temperature in the range preferably from 40 to 130° C., more preferably from 60 to 130° C. and then cooled, there is obtained the thermosetting powder paint composition of the present invention in which the additives are compounded. When this composition is uniformly ground thereafter to suitable particle size (usually, 150 mesh or less), a powder paint in the form of a fine powder is obtained. As this melting and kneading apparatus, usually, a heat roll, heat kneader and extruder can be used.

As a specific example of a method for coating a thermosetting powder paint composed of the composition of the present invention, there is listed, for example, a method in which the thermosetting powder paint is allowed to adhere to the object by a coating method such as electrostatic coating method and flow immersion method, and the paint is heated to be thermally cured to form a coating film. Baking for this thermal setting is usually conducted at a temperature of about 100° C. to about 200° C., preferably about 120° C. to about 180° C. for usually about 10 minutes to about 60 minutes. By this baking procedure, the acrylic copolymer (A), organic modified polysiloxane (B) and curing agent (C) are crosslinked. After this baking, when the crosslinked product is cooled to room temperature, a cured coating film having excellent properties is obtained.

The thermosetting powder paint composition of the present invention is very useful particularly for top coating used on the body or parts of, for example, an automobile because the composition has the excellent properties as described above. Especially, the composition is very useful for a method in which the body or parts of an automobile is top-coated using a thermosetting powder paint composed of the composition of the present invention, a method in which a thermosetting powder paint composed of the composition of the present invention is coated electrostatically as a top coat paint on a base-coat paint composed of an aqueous paint containing a pigment of a metallic aqueous paint, then, the base-coat paint and the top coat paint are simultaneously baked, and the like.

[Concept of Term "Derivative"]

The concept of term "derivative" used in the present claims and specification include compounds obtained by substituting a hydrogen atom of a specific compound with the other atom or atom group Z. Herein, Z is a monovalent hydrocarbon group containing at least one carbon atom, and more specifically, an aliphatic group, alicycric group of which aromatic content is substantially low, group formed by combining them, or may be a residual group formed by bonding a hydroxyl group, carboxyl group, amino group, nitrogen, silicon sulfide, phosphorus and the like to them, and among them, groups having narrowly defined aliphatic structure are preferable. Z may be, for example, a group derived from the above-described groups by substitution with a hydroxyl group, alkyl group, cycloalkyl group, allyl group, alkoxyl group, cycloalkoxyl group, allyloxyl group, halogen (F, Cl, Br and the like) group and the like. By suitably selecting these substituents, it is possible to control various properties of a film formed from the powder paint composition of the present invention.

The following examples and comparative examples further illustrate the present invention specifically, however, these examples and comparative examples are only for helping of understanding of the content of the present invention and do not limit the present invention in any way. In the following description, "part" and "%" mean "part by weight" and "% by weight" respectively unless otherwise stated.

[Production Examples 1 to 4: Production of Acrylic Copolymer]

First, into a 4-necked flask equipped with a stirrer, thermometer, reflux condenser and nitrogen introducing tube, xylene was charged as an organic solvent, and heated up to reflux temperature with stirring. The amount charged of xylene was an amount corresponding to 66.7 parts by weight based on the total weight of the monomers charged later. Then, t-butyl-peroxy-2-ethylhexanoate (tradename: Perbutyl O, manufactured by NOF Corp.) as a radical polymerization initiator in an amount shown in Table 1 was dissolved in monomers shown in Table 1. The mixture solution was dropped over the period of 5 hours, further, 0.5 parts of Perbutyl O was dropped thereafter, and the mixture was kept at 100° C. for 5 hours. A solid acrylic copolymer (Production Examples 1 to 4) was obtained by removing a solvent of the resulted polymer solution with heating under reduced pressure. The physical properties of the resulted acrylic co-polymer (Production Examples 1 to 4) were analyzed by the following method, and the results are also shown in Table 1.

① Glass Transition Temperature (Tg)

It was calculated according to the formula of Fox, based on monomer composition.

② Number Average Molecular Weight (Mn)

It was measured by GPC using polystyrene as a standard.

[Production Example 5: Production of Acrylic Copolymer]

The same procedure as in Production Example 1 was conducted except that 0.1 part by weight of polydimetylsiloxane macro monomer (trade name Silicone Macro Monomer AK-30, manufactured by Toagosei Co., Ltd.) as a monomer component was copolymerized together with the monomer (a1) and the monomer (a2), to obtain a solid acrylic copolymer (Production Example 5) in which the silicone macro monomer is co-polymerized.

[Production Example 6: Production of Acrylic Copolymer]

The same procedure as in Production Example 1 was conducted except that 0.1 part by weight of γ-methacryloxypropyltrimethoxysilane as a monomer component was copolymerized together with the monomer (a1) and the monomer (a2), to obtain a solid acrylic copolymer (Production Example 6) in which the silicone macro monomer is co-polymerized.

[Production Example 7: Production of Organic Modified Polysiloxane-Containing Acrylic Copolymer]

The same reaction vessel as in Production Example 1 was charged with 66.7 parts by weight of xylene as an organic solvent. Then, to this was further added 0.1 part by weight of X-22-163A (trade name, manufactured by Shin-Etsu Chemical Co., Ltd., both terminals epoxy-modified dimethylpolysiloxane, epoxy equivalent 950 g/eq) as an organic modified polysiloxane, and the mixture was heated up to reflux temperature with stirring.

Then, 5.0 parts by weight of Perbutyl O was dissolved in monomers shown in Table 1, the mixture solution was dropped over the period of 5 hours, further, 0.5 parts of Perbutyl O was dropped thereafter, and the mixture was kept at 100° C. for 5 hours. A solid organic modified polysiloxane-containing acrylic copolymer (Production Example 7) having number average molecular weight of 2800 was obtained by removing a solvent of the resulted polymer solution with heating under reduced pressure.

[Production Example 8: Production of Organic Modified Polysiloxane-Containing Acrylic Copolymer]

The same reaction vessel as in Production Example 1 was charged with 100 parts by weight of xylene. then, to this was added 100 parts by weight of the acrylic copolymer obtained in the Production Example 1, and mixture was heated at 100° C. with stirring for uniform dissolution, and, to this was further added 0.1 part by weight of KF-8012 (trade name, manufactured by Shin-Etsu Chemical Co., Ltd., both terminals amino-modified dimethylpolysiloxane, —$NH_2$ equivalent 2,300 g/eq) as the organic modified polysiloxane, and the mixture was heated to reflux temperature thereof with stirring, to disperse the organic modified polysiloxane uniformly.

Then, a solvent of the resulted resin solution was removed by heating under reduced pressure, to obtain a solid acrylic copolymer (Production Example 8) having number average molecular weight 2900 in which the organic modified polysiloxane is modified.

[Production Example 9: Production of Acrylic Copolymer in which Silane Compound is Modified]

The same reaction vessel as in Production Example 1 was charged with 100 parts by weight of xylene. Then, to this was added 100 parts by weight of the acrylic copolymer obtained in the Production Example 1, and mixture was heated at 100° C. with stirring for uniform dissolution, and, to this was further added 0.1 part by weight of γ-aminopropyltrimethoxysilane, and the mixture was heated to reflux temperature thereof with stirring, to disperser-aminopropyltrimethoxysilane uniformly. Then, a solvent of the resulted resin solution was removed by heating under reduced pressure, to obtain a solid acrylic copolymer (Production Example 9) having number average molecular weight 2800 in which γ-arinopropyltrimethoxysilane is contained.

[Production Example 10: Production of Linear Dodecanedioic Acid Anhydride (c2)]

Dodecanedioic acid and acetic anhydride (molar ratio=1:0.8) were charged into a reaction vessel, the mixture was heated at 150° C., and reacted for 5 hours with removing acetic acid produced with keeping the system under reduced pressure or vacuum so that acetic anhydride did not flow out of the system. After completion of the reaction, cooled immediately, to obtain a white solid [liner dodecanedioic acid anhydride (Production Example 10)]. This compound had a melting point of about 73 to about 82° C.

EXAMPLES 1 to 14

The acrylic copolymer (A) produced in Production Examples 1 to 4, organic modified polysiloxane (B) and curing agent (C) were mixed in a ratio by weight shown in Table 2 (functional group in curing agent (C)/epoxy group in acrylic copolymer (A)=1/1), and to this was added 1 part by weight of TINUVIN144 (trade name, manufactured by Chiba Specialty Chemicals K.K., photostabilizer), 1 part by weight of benzoin (inflation inhibitor), 2 part by weight of TINUVIN900 (manufactured by Chiba Specialty Chemicals K.K., ultraviolet ray absorber), and only in Examples 12 to 14, 0.3 parts by weight of tin octanoate (trade name: Neostann U-28, curing catalyst, manufactured by NITTO KASEI Co., Ltd.), based on 100 parts of the total amount of the acrylic copolymer (A) and the curing agent (C). The resulted mixture was dry-blended using a Henschel mixer, then, kneaded (passed) twice using Twinscrew Extruder PCM-30 (manufactured by Ikegai Kihan K.K.) with setting a cylinder temperature at 110° C. and a rotation of the screw at 200 rpm. The melt kneaded material was cooled, then, finely group by a grinding machine, and a fraction passed a sieve of 150 mesh was recovered, to obtain thermosetting powder paints (Examples 1 to 14).

EXAMPLES 15, 16

The same procedure as in Example 1 was conducted except that the organic modified polysiloxane-containing acrylic copolymer obtained in Production Examples 7 and 8 and the curing agent (C) were compounded in a compounding ratio shown in Table 2, to obtain thermosetting powder paints (Examples 15 and 16).

Comparative Example 1

The same procedure as in Example 1 was conducted except that the organic modified polysiloxane was not used, to obtain a thermosetting powder paint (Comparative Example 1).

Comparative Example 2

The same procedure as in Example 2 was conducted except that the organic modified polysiloxane was not used, to obtain a thermosetting powder paint (Comparative Example 2).

Comparative Example 3

The same procedure as in Comparative Example 1 was conducted except that 1 part by weight of Resimix RL-4 (trade name, manufactured by Mitsui Chemicals, Inc.) was added as a leveling agent, to obtain a thermosetting powder paint composition (Comparative Example 3).

Comparative Example 4

The same procedure as in Example 1 was conducted except that 5.0 part by weight of X-22-3701E (trade name, manufactured by Shin-Etsu Chemical Co., Ltd.) was used as the organic modified polysiloxane (B), to obtain a thermosetting powder paint composition (Comparative Example 4).

Comparative Example 5

The same procedure as in Example 1 was conducted except that 0.1 part by weight of SF8416 (trade name, manufactured by Dow Corning Toray Silicone Co., Ltd.) which is a side chain alkyl modified dimethylpolysiloxane was added instead of the organic modified polysiloxane (B) within the claims of the present invention, to obtain a thermosetting powder paint composition (Comparative Example 5).

Comparative Example 6

The same procedure as in Example 1 was conducted except that 0.1 part by weight of KF96H-10000 (trade name, manufactured by Shin-Etsu Chemical Co., Ltd., viscosity at 25° C.: 10,000 cst) which is a polydimethylsiloxane carrying no reactive functional group modified was added instead of the organic modified polysiloxane (B) within the claims of the present invention, to obtain a thermosetting powder paint composition (Comparative Example 6).

Comparative Example 7

The same procedure as in Comparative Example 1 was conducted except that 0.1 part by weight of γ-glycidoxypropyltrimethoxysilane was added instead of the organic modified polysiloxane (B) within the claims of the present invention, to obtain a thermosetting powder paint composition (Comparative Example 7).

Comparative Example 8

The same procedure as in Example 1 was conducted except that 100 parts by weight of the acrylic copolymer in which the silicone macro monomer is copolymerized and is obtained in Production Example 5, and 30.9 parts by weight of dodecanedioic acid as a curing agent was used to obtain a thermosetting powder paint (Comparative Example 8).

Comparative Example 9

The same procedure as in Example 1 was conducted except that 100 parts by weight of the acrylic copolymer in which the silicone-based monomer (γ-methacryloxypropyltrimethoxysilane) is copolymerized and is obtained in Production Example 6, and 31.1 parts by weight of dodecanedioic acid as a curing agent was used to obtain a thermosetting powder paint (Comparative Example 9).

Comparative Example 10

The same procedure as in Example 1 was conducted except that 100 parts by weight of the γ-aminopropyltrimethoxysilane modified acrylic copolymer obtained in Production Example 9, and 31.0 parts by weight of dodecanedioic acid as a curing agent was used to obtain a thermosetting powder paint (Comparative Example 10).

Evaluation of Examples and Comparative Examples

A black paint containing polyester-melamine crosslinkage was coated on 0.8 mm thick satin finished steel plate which had been treated with zinc phosphate so as to make 20 μm film thickness, then baked at 170° C. for 30 minutes, to prepare a primer-treated steel plate. The thermosetting powder paint prepared in each Examples and Comparative Examples was coated electrostatically on this primer-treated steal plate so as to obtain a film thickness of 60 to 70 μm, and baked at 150° C. for 30 minutes to obtain a coated plate.

This coated plate was subjected to the following evaluations.

① Smoothness of Coating Film

Appearance of a coating film was evaluated with eyes regarding smoothness, and very excellent smoothness was represented by ⊚, excellent by ○, slight unevenness by Δ, and poor by x.

② Clear Brilliance of Coating Film

Appearance of a coating film was evaluated with eyes regarding clear brilliance, and very excellent clear brilliance was represented by ⊚, excellent by ○, slight haze by Δ, and poor by x.

③ Gloss

It was evaluated by measured value of a gloss meter (60° gloss).

④ Solvent resistance

The surface of a coating film was rubbed by reciprocation movement of a gauze impregnated with xylene for 50 times, then, the rubber part was visually observed. Complete no trace was represented by ⊚, slight trace by ○, and remarkable trace by x.

⑤ Acid Resistance (Acid Rain Resistance)

The surface of a coating film was spotted with 0.4 ml of a 40 vol % aqueous sulfuric acid solution, left for 20 minutes in a drier at 60° C., then, the spotted part was washed with was and dried, and the surface condition of the coating film was observed visually. Complete no trace was represented by ⊚, slight trace by ○, remarkable trace by Δ, and etching on the whole surface by x.

⑥ Mar Resistance

A mar test was conducted in which the surface of a coating film is rubbed with a brush using a 3% cleanser suspension solution, and gloss (20° gloss) was evaluated before and after the rubbing, and gloss retention was calculated. A coating film having a gloss retention of 60% or more can be judged as a coating film having very excellent mar resistance to be represented by ⊚; one having a gloss retention of not less than 50% and less than 60% can be judged as one having excellent mar resistance to be represented by ○; one having a gloss retention of less than 50% should be judged as one having insufficient mar resistance to be represented by x.

⑦ Weather Resistance

A coating film was irradiated for 2,000 hours using a QUV tester, and gloss at 20° before and after this irradiation was evaluated, and gloss retention at 20° was calculated. The gloss retention was calculated according to the following formula.

Gloss retention[%] =

(20° gloss after irradiation) ÷ (20° gloss before irradiation) × 100

A gloss retention of 80% or more was represented by ⊚, 70 to 80% by ○, and 70% or less by x.

⑧ Storage Stability of Powder Paint

A powder paint composition was stored for 30 days in a thermostat at 30° C. Then, this powder paint composition was molded into a 0.3 g pallet of 10 mmφ. This pellet was pasted onto a 0.8 mm thick satin finished steep plate which had been treated with zinc phosphate, the plate was kept in vertical position, and kept in atmosphere of 150° C. for 30 minutes. Flowability with heating in this treatment was measured. A flowability of the pellet of 100 mm or more was represented by ○, 20 mm or more and less than 100 mm by Δ, less than 20 mm by $x_o$.

⑨ Recoating Property

A coated plate which had been baked for 30 minutes at 150° C. was further over-baked at the same temperature for 30 minutes, then, the same powder paint used for the formation of the coating film of the coated plate was coated electrostatically, and baked for 30 minutes at 150° C. This test coating film was subjected to adherence test of 2 mm width and 10×10, after this test, the number of squares remained without releasing was shown. Completely no releasing recognized was represented by 100, and the coating film was judged to have excellent re-coating property, and complete releasing was represented by 0, and the coating film was judged to have insufficient re-coating property.

The evaluation results of coating films obtained by the above-described methods are shown in Tables 3 to 5. Examples 1 to 16 relates to compositions in which the kind and combination of structural elements are changed within the range of the present invention. Comparative Examples 1 to 10 relates to compositions in which the kind and combination of structural elements are out of the range of the present invention, to be compared with the compositions of the present invention.

As is apparent from the evaluation results in Examples 1 to 16, the compositions of the present invention manifest simultaneously excellent properties regarding all evaluation items ① to ⑨.

Comparative Examples 1 and 2 show examples of powder paint compositions which did not use the organic modified polysiloxane (B), and the smoothness, acid resistance and mar resistance of the coating film are poor.

Comparative Example 3 shows an example in which the organic modified polysiloxane (B) was not used, and an acrylic leveling agent having low Tg was used. In this example, the smoothness of the coating film is excellent as compared with Comparative Example 1, however, improve in the acid resistance and mar resistance of the coating film is not sufficient.

Comparative Example 4 show an example in which the organic modified polysiloxane (B) was excessively used In this example, the solvent resistance and re-coating property of the coating film are poor.

Comparative Examples 5 and 6 show examples in which a polysiloxane having no reactive functional group out of the claims of the present invention was used. In these examples, the mar resistance, acid resistance and re-coating property of the coating film are poor.

Example 7 shows an example in which 0.1 part by weight of γ-glycidoxypropyltrimethoxysilane was added instead of the organic modified polysiloxane (B) within the claims of the present invention. In this example, the acid resistance and mar resistance of the coating film and the storage stability of the powder paint are poor.

Comparative Example 8 shown an example in which an acrylic co-polymer in which a silicone macro monomer is copolymerized was used. In this example, improvement in the recoating property of the coating property is insufficient.

Comparative Example 9 shown an example in which an acrylic co-polymer in which a silicone-based monomer (γ-methacryloxypropyltrimethoxysilane) is copolymerized was used. In this example, the mar resistance and acid resistance of the coating film and the storage stability of the paint are poor.

Comparative Example 10 shown an example in which an acrylic co-polymer in which γ-aminopropyltrimethoxysilane is modified was used. In this example, the mar resistance and acid resistance of the coating film and the storage stability of the paint are poor.

TABLE 1

Acrylic Copolymers in Production Examples 1 to 6

| | | | Production Example | | | | | |
|---|---|---|---|---|---|---|---|---|
| | | | 1 | 2 | 3 | 4 | 5 | 6 |
| Elements Constituting Copolymer | Monomer (a1) | GMA | 40.0 | 55.0 | 40.0 | 28.5 | 40.0 | 40.0 |
| | Monomer (a2) | ① ST | 10.0 | 20.0 | 25.0 | 15.0 | 10.0 | 10.0 |
| | | ② MMA | 39.3 | 20.0 | 12.0 | 34.0 | 39.3 | 39.3 |
| | | ③ nRMA | 10.7 | 5.0 | — | 22.5 | 10.7 | 10.7 |
| | | ④ 2EHMA | — | — | 23.0 | — | — | — |
| | Silicone Macro Monomer | AK-30 | — | — | — | — | 0.1 | — |
| | Silicon Containing Monomer | γ-MPMS | — | — | — | — | — | 0.1 |
| | Polymerization Initiator | PB-O | 5.0 | 4.7 | 4.5 | 5.0 | 5.0 | 5.0 |
| Physical Property | Tg (° C.) | | 70 | 65 | 48 | 65 | 70 | 70 |
| | Number Average Molecular Weight (Mn) | | 2800 | 3000 | 3200 | 2800 | 2900 | 2900 |

Monomer (a1) GMA; glycidyl methacrylate
Monomer (a2) ① ST; styrene, ② MMA; mthyl methacrylate, ③ nBMA; n-butyl methacrylate, ④ 2EHMA; 2-ethylhexyl methacrylate
Polymerization initiator PB-O; t-butyl peroxy-2-ethylhexanoate
Silicone macro monomer AK-30; slicone macro monomer AK-30 (trade name, manufactured by Toagosei Co., Ltd., Mn = 30,000)
Silicon containing monomer γ-MPMS; γ-methacryloxypropyltrimethoxysilane

TABLE 2

Paint Compositions in Examples

| | | Acrylic Copolymer (A) | | Organic Modified Polysiloxane (B) | | Curing Agent (C) | |
|---|---|---|---|---|---|---|---|
| Examples | 1 | Pro. Ex. 1 | 100 | X-22-3701E | 0.1 | DDA | 30.9 |
| | 2 | Pro. Ex. 2 | 100 | X-22-3701E | 0.1 | DDA | 42.4 |
| | 3 | Pro. Ex. 3 | 100 | X-22-3701E | 0.1 | DDA | 31.6 |
| | 4 | Pro. Ex. 4 | 100 | X-22-3701E | 0.1 | DDA | 22.0 |
| | 5 | Pro. Ex. 1 | 100 | X-22-3701E | 0.8 | DDA | 30.9 |
| | 6 | Pro. Ex. 1 | 100 | X-22-3701E | 0.025 | DDA | 30.9 |
| | 7 | Pro. Ex. 1 | 100 | SF8411 | 0.1 | DDA | 30.9 |
| | 8 | Pro. Ex. 1 | 100 | BY16-750 | 0.1 | DDA | 30.9 |
| | 9 | Pro. Ex. 1 | 100 | KF102 | 0.1 | DDA | 30.9 |
| | 10 | Pro. Ex. 1 | 100 | X22-173DX | 0.2 | DDA | 30.9 |
| | 11 | Pro. Ex. 1 | 100 | KF8012 | 0.1 | DDA | 30.9 |
| | 12 | Pro. Ex. 1 | 100 | X22-3701E | 0.1 | Pro. Ex. 9 | 44.3 |
| | 13 | Pro. Ex. 1 | 100 | X22-3701E | 0.1 | VXL1381 | 46.2 |
| | 14 | Pro. Ex. 1 | 100 | X22-3701E | 0.1 | Ls2125 | 44.3 |
| | 15 | Pro. Ex. 6 | 100 | | | DDA | 31.0 |
| | 16 | Pro. Ex. 7 | 100 | | | DDA | 30.8 |

X-22-3701E; side chain carboxyl modified dimethylpolysiloxane (trade name, manufactured by Shin-Etsu Chenical Co., Ltd.)
SF8411; side chain epoxy modified dimethylpolysiloxane (trade name, manufactured by DOW Corning Toray Silicone Co., Ltd.)
BY16-750; Both terminals carboxyl modified dimethylpolysiloxane (trade name, manufactured by Dow Corning Toray Silicone Co., Ltd.)
KF-102 side chain alicyclic epoxy modified dimethylpolysiloxane (trade name, manufactured by Shin-Etsu Chemical Co., Ltd.)
X-22-173DX; One terminal epoxy modified dimethylpolysiloxane (trade name, manufactured by Shin-Etsu Chemical Co., Ltd.)
KF8012; Both terminals amino modified dimethylpolysiloxane (trade name, manufactured by Shin-Etsu Chemical Co., Ltd.)
DDA; Dodecanedoic acid
VXL1381; Additol VXL1381 (trade name, manufactured by Vianoa Resins GmbH, aliphatic polyacidanhydride)
LS2125; Crelan LS2125 (trade name, manufactured by Bayer, urethane-modified polyacidanhycride)

TABLE 3

Evaluation Results 1 in Examples

| | Example | | | | | | | |
|---|---|---|---|---|---|---|---|---|
| | 1 | 2 | 3 | 4 | 5 | 6 | 7 | 8 |
| ① Smoothness | ⊙ | ○ | ⊙ | ⊙ | ⊙ | ○ | ⊙ | ⊙ |
| ② Clear Brilliance | ○ | △ | ⊙ | ⊙ | ○ | ⊙ | ○ | ⊙ |
| ③ Gloss (60°) | 93 | 92 | 94 | 94 | 94 | 91 | 89 | 93 |
| ④ Solvent Resistance | ⊙ | ⊙ | ⊙ | ⊙ | ○ | ⊙ | ⊙ | ⊙ |
| ⑤ Acid rain Resisance | ⊙ | ○ | ⊙ | ⊙ | ⊙ | ○ | ⊙ | ⊙ |
| ⑥ Mar Resistarice | ⊙ | ⊙ | ⊙ | ○ | ⊙ | ○ | ⊙ | ⊙ |
| ⑦ Weather Resistance | ⊙ | ⊙ | ⊙ | ⊙ | ⊙ | ○ | ⊙ | ⊙ |
| ⑧ Storage stability | ○ | ○ | ○ | ○ | ○ | ○ | ○ | ○ |
| ⑨ Recoating Property | 100 | 100 | 100 | 100 | 100 | 100 | 100 | 100 |

TABLE 4

Evaluation Results 2 in Examples

| | Example | | | | | | | |
|---|---|---|---|---|---|---|---|---|
| | 9 | 10 | 11 | 12 | 13 | 14 | 15 | 16 |
| ① Smoothness | ⊙ | ⊙ | ⊙ | ⊙ | ⊙ | ○ | ⊙ | ⊙ |
| ② Clear Brilliance | ○ | ○ | ○ | ⊙ | ○ | ○ | ⊙ | ⊙ |
| ③ Gloss (60°) | 91 | 93 | 93 | 94 | 94 | 88 | 92 | 93 |
| ④ Solvent Resistance | ⊙ | ⊙ | ⊙ | ⊙ | ⊙ | ⊙ | ⊙ | ⊙ |
| ⑤ Acid rain Resisance | ⊙ | ⊙ | ⊙ | ⊙ | ⊙ | ○ | ⊙ | ⊙ |
| ⑥ Mar Resistace | ○ | ○ | ○ | ○ | ○ | ○ | ○ | ○ |
| ⑦ Weather Resistance | ⊙ | ⊙ | ⊙ | ⊙ | ⊙ | ○ | ⊙ | ⊙ |
| ⑧ Storage Stability | ○ | ○ | ○ | ○ | ○ | △ | ○ | ○ |
| ⑨ Recoating Property | 100 | 100 | 100 | 100 | 100 | 100 | 100 | 100 |

TABLE 5

Evaluation Results in Comparative Examples

| | Example | | | | | | | | | |
|---|---|---|---|---|---|---|---|---|---|---|
| | 1 | 2 | 3 | 4 | 5 | 6 | 7 | 8 | 9 | 10 |
| ① Smoothness | X | X | ⊙ | ⊙ | ○ | ○ | ⊙ | ⊙ | ⊙ | ⊙ |
| ② Clear Brilliance | △ | △ | ○ | X | X | X | ○ | ⊙ | X | X |
| ③ Gloss (60°) | 88 | 89 | 93 | 65 | 84 | 70 | 89 | 89 | 64 | 62 |
| ④ Solvent Resistance | ○ | ○ | ○ | X | X | X | X | ○ | X | X |
| ⑤ Acid rain Resisance | X | X | X | ⊙ | X | X | X | ○ | X | X |
| ⑥ Mar Resistance | X | X | X | ⊙ | X | X | X | ○ | X | X |
| ⑦ Weather Resistance | ○ | ○ | ○ | ⊙ | ⊙ | ○ | X | ⊙ | X | X |
| ⑧ Storage Stability | ○ | ○ | ○ | △ | ○ | ○ | X | △ | X | X |
| ⑨ Recoating Property | 100 | 100 | 100 | 0 | 0 | 0 | 100 | 0 | 100 | 100 |

What is claimed:

1. A thermosetting powder paint composition for top coating comprising:

100 parts by weight of an acrylic copolymer (A) obtained by polymerization in a reaction system containing a monomer (a1) having at least one radical-polymerizable unsaturated bond and at least one epoxy group in one molecule and a monomer (a2) having at least one radical-polymerizable unsaturated bond and no epoxy group in one molecule, and 0.01 to 2.0 parts by weight of an organic modified polysiloxane (B) having at least one functional group, at least two silicon atoms, and no radical-polymerizable unsaturated bond in one molecule, wherein the component (B) is contained in the condition that a part or all thereof has reacted and bonded with the component (A) or all thereof has not reacted with the component (A).

2. The thermosetting powder paint composition according to claim 1, further comprising 5 to 60 parts by weight of a curing agent (C) composed of at least one polyvalent carboxylic acid-based compound selected from the group consisting of a polyvalent carboxylic acid (c1) and a polyvalent carboxylic anhydride (c2).

3. The thermosetting powder paint composition according to claim 2, wherein the functional group of the organic modified polysiloxane (B) is a group having reactivity to the acrylic copolymer (A) or the curing agent (C).

4. The thermosetting powder paint composition according to claim 2, wherein the component (B) is contained in the condition that a part or all thereof has reacted and bonded with the component (A) or the component (C).

5. The thermosetting powder paint composition according to claim 1, wherein the copponent (B) is contained in the condition that all thereof has not reacted with the other components.

6. The thermosetting powder paint composition according to claim 1, wherein the organic modified polysiloxane (B) includes at least one organic modified polysiloxane represented by any of the following general formulae (I), (II), (III) and (IV):

(I)
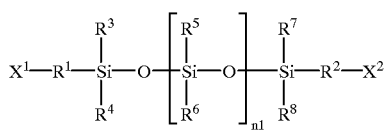

wherein the formula (I), $X^1$ and $X^2$ are a group represented by any of the following general formulae (a) to (f)

(a)
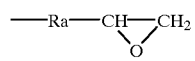

(b)
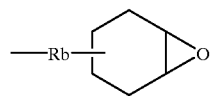

(c)
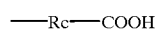
——Rc——COOH (d)
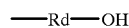
——Rd——OH (e)
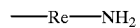
——Re——NH$_2$ (f)
——Rf (g)
——H wherein formulae (a) to (f), Ra, Rb, Rc, Rd and Re represent a direct bond, alkylene group having 1 to 8 carbon atoms, phenylene group, alkylene group derivative, phenylene group derivative, or hydrocarbon group having an ether bond and/or ester bond, and Rf represents an alkyd group having 1 to 8 carbon atoms, phenyl group or derivative thereof, $R^1$ and $R^2$ represent a direct bond, alkylene group having 1 to 8 carbon atoms, phenylene group or derivative thereof, $R^3$ to $R^8$ represent an alkyl group having 1 to 8 carbon atoms, phenyl group or derivative thereof, and n1 represents a number from 1 to 1,500, (II)
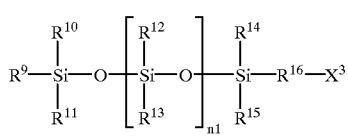

wherein the formula (II), $X^3$ is a group represented by any of the above-described general formulae (a) to (e), $R^9$ to $R^{15}$ represent an alkyl group having 1 to 8 carbon atoms, phenyl group or derivative thereof, $R^{16}$ represents a direct bond, alkylene group having 1 to 8 carbon atoms, phenylene group, alkylene group derivative, phenylene group derivative, or hydrocarbon group having an ether bond and/or ester bond, and n2 represents a number from 1 to 1,500, (III)
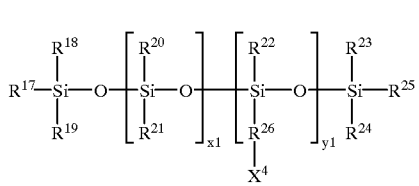

wherein the formula (III), $X^4$ is a group represented by any of the above-described general formulae (a) to (e), $R^{17}$ to $R^{25}$ represent an alkyl group having 1 to 8 carbon atoms, phenyl group or derivative thereof, $R^{26}$ represents a direct bond, alkylene group having 1 to 8 carbon atoms, phenylene group, alkylene group derivative, phenylene group derivative, or hydrocarbon group having an ether bond and/or ester bond, x1 represent a number from 1 to 1,300, and y1 represents a number from 1 to 200, (IV)
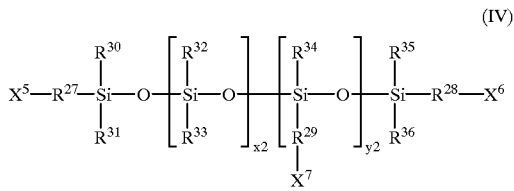

wherein the formula (IV), $X^5$, $X^6$ and $X^7$ are a group represented by any of the above-described general formulae (a) to (e), $R^{30}$ to $R^{36}$ represent an alkyl group having 1 to 8 carbon atoms, phenyl group or derivative thereof, $R^{27}$ to $R^{29}$ represent a direct bond, alkylene group having 1 to 8 carbon atoms, phenylene group, alkylene group derivative, phenylene group derivative, or hydrocarbon group having an ether bond and/or ester bond, x2 represent a number from 1 to 1,300, and y2 represents a number from 1 to 200.

7. The thermosetting powder paint composition according to claim 1, wherein the organic modified polysiloxane (B) includes at least one organic modified polysiloxane represented by any of the following general formulae (V), (V'), (VI), (VI'), (VII), (VII'), (VIII), (VIII'), (IX), (X), (XI), (XII), (XIII), (XIV), (XV), (XVI), (XVII), (XVIII), (XIX), (XX), (XXI), (XXII), (XXIII), (XXIV), (XXV), (XXVI), (XXVII) and (XXVIII);

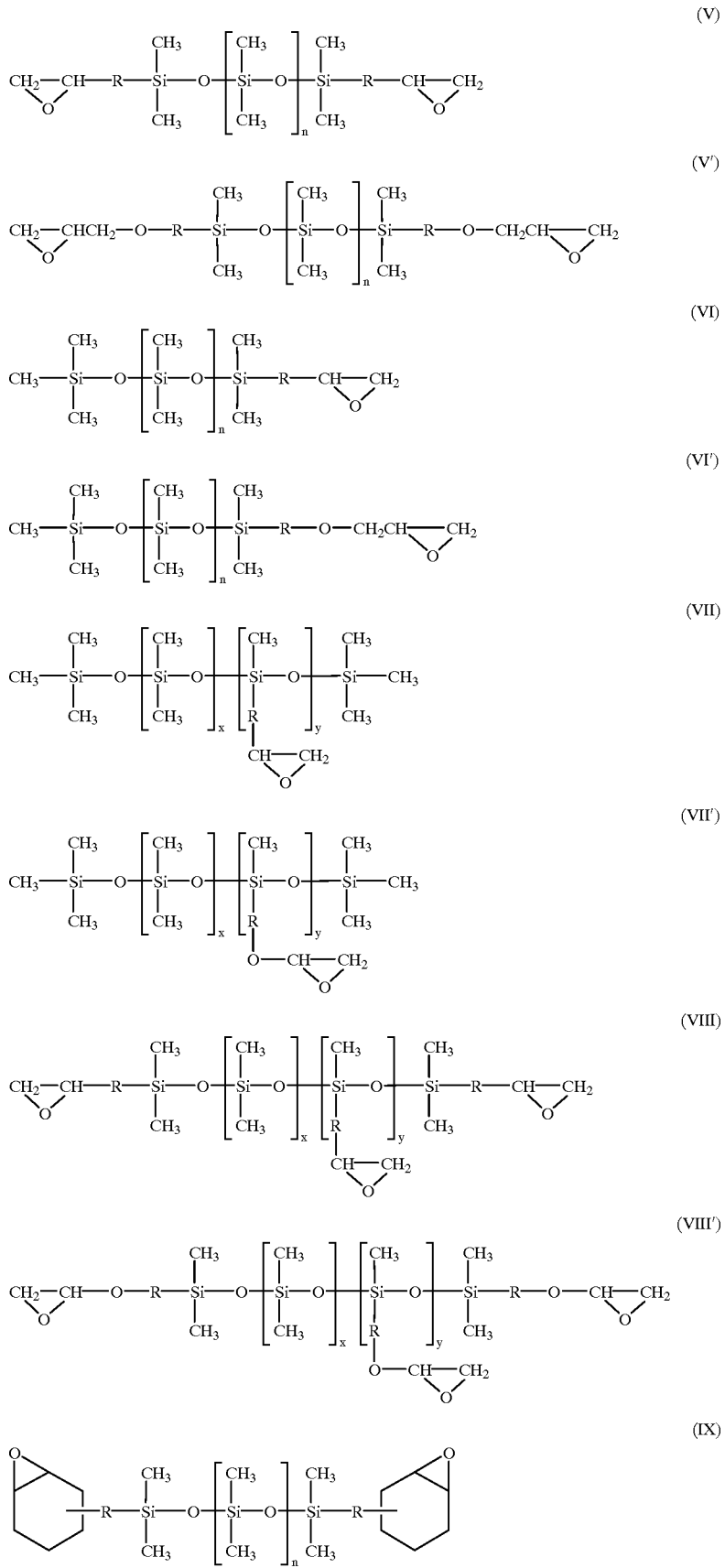

-continued
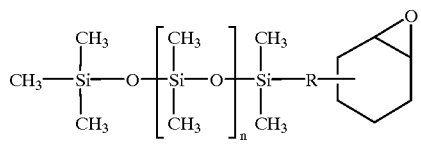
(X)
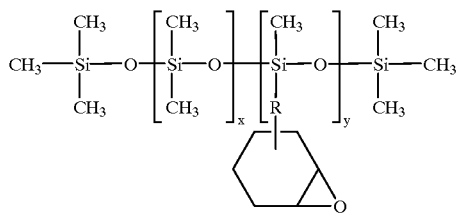
(XI)
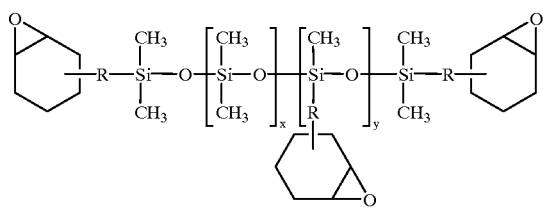
(XII)
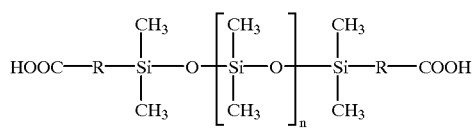
(XIII)
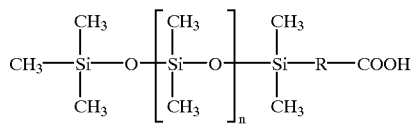
(XIV)
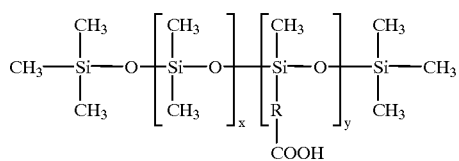
(XV)
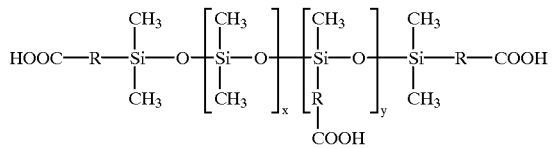
(XVI)
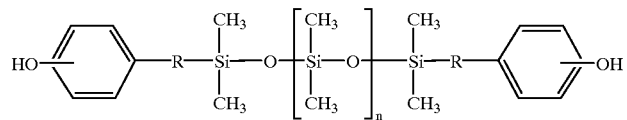
(XVII)
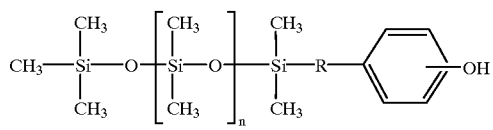
(XVIII)

-continued
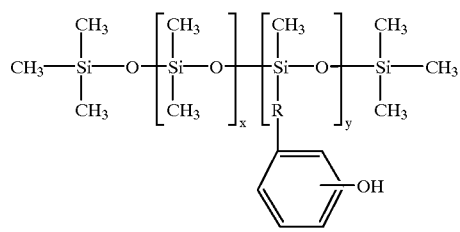
(XIX)
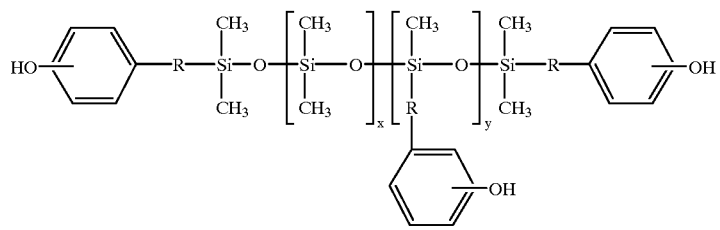
(XX)
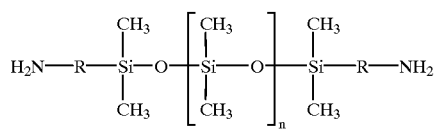
(XXI)
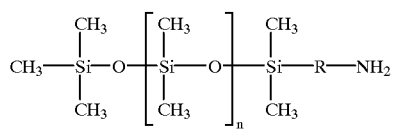
(XXII)
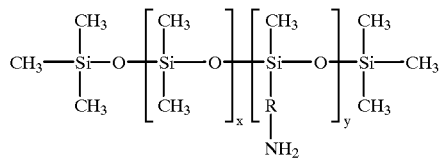
(XXIII)
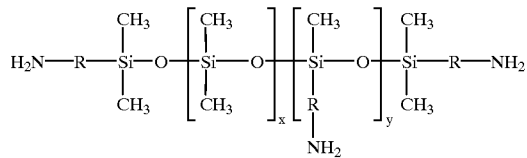
(XXIV)
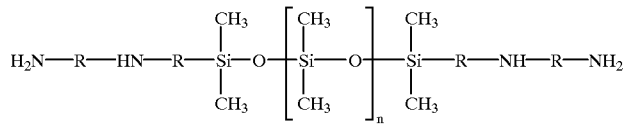
(XXV)
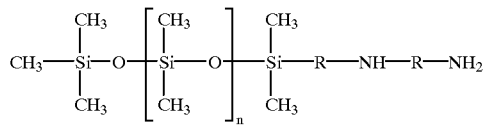
(XXVI)

-continued

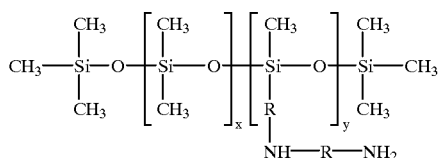
(XXVII)

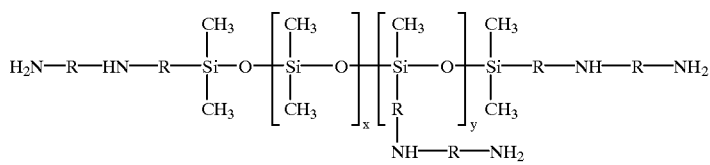
(XXVIII)

wherein the formulae (V) to (XXVIII), R each independently represents a direct bond, alklene group having 1 to 20 carbon atoms, phenylene group, alklene group derivative, phenylene group derivative, or hydrocarbon group having an ether bond and/or ester bond, n each independently represents a number from 1 to 1,500, x each independently represents a number from 1 to 1, 300, and y each independently represents a number from 1 to 200.

8. The thermosetting powder paint composition according to claim 7, wherein the organic modified polysiloxane represented by any of the general formulae (V) to (XII) has an epoxy equivalent from 200 to 5,000.

9. The thermosetting powder paint composition according to claim 7, wherein the organic modified polysiloxane having a carboxyl group represented by any of the general formulae (XIII) to (XVI) has a carboxyl equivalent from 500 to 5,000.

10. The thermosetting powder paint composition according to claim 7, wherein the organic modified polysiloxane which is modified with phenol represented by any of the general formulae (XVII) to (XX) has a —OH equivalent from 1,000 to 5,000.

11. The thermosetting powder paint composition according to claim 7, wherein the organic modified polysiloxane having an amino group represented by any of the general formulae (XXI) to (XXVIII) has a —NH$_2$ equivalent from 500 to 10,000.

12. The thermosetting powder paint composition according to claim 1, wherein 0.01 to 1.0 parts by weight of the organic modified polysiloxane (B) is contained per 100 parts by weight of the acrylic copolymer (A).

13. The thermosetting powder paint composition according to claim 1, wherein the acrylic copolymer (A) is a copolymer obtained by polymerization in a reaction system containing 15 to 60 parts by weight of the monomer (a1) and 40 to 85 parts by weight of the monomer (a2) based on 100 parts by weight of the total weight of the monomer (a1) and the monomer (a2); and 40 to 85 parts by weight of the monomer (a2) contains 1 to 30 parts by weight of styrene and 39 to 55 parts by weight of a (meth)acrylate having a C1 to C12 alkyl group and/or cyclohexyl group.

14. The thermosetting powder paint composition according to claim 1, wherein the monomer (a1) includes at least one monomer selected from the group consisting of glycidyl (meth)acrylate and β-methylglycidyl (meth)acrylate.

15. The thermosetting powder paint composition according to claim 2, wherein the amount of the crosslinkable functional group in the curing agent (C) is from 0.5 to 1.5 equivalent per one equivalent of the epoxy group in the acrylic copolymer (A).

16. The thermosetting powder paint composition according to claim 15, wherein the melting point of the curing agent (C) is from 40 to 170° C.

17. The thermosetting powder paint composition according to claim 16, wherein the polyvalent carboxylic acid (c1) is an aliphatic dicarboxylic acid having 8 to 20 carbon atoms, the polyvalent carboxylic acid anhydride (c2) is a linear dimer or more, oligo or polyacidanhydride derived from dehydration condensation of an aliphatic dicarboxylic acid having 8 to 20 carbon atoms.

18. A method for producing a thermosetting powder paint using the composition of claim 1, which comprising the steps of:
melting and kneading raw materials containing at least the acrylic copolymer (A), organic modified polysiloxane (B) and curing agent (C), and
cooling and grinding the melted and kneaded material.

19. The method for producing a thermosetting powder paint according to claim 18, wherein the melting and kneading step is conducted at a temperature from 40 to 130° C.

* * * * *

UNITED STATES PATENT AND TRADEMARK OFFICE
CERTIFICATE OF CORRECTION

PATENT NO. : 6,121,378
DATED : September 19, 2000
INVENTOR(S) : Takahisa Miyawaki et al.

It is certified that error appears in the above-identified patent and that said Letters Patent is hereby corrected as shown below:

Item [56],
Add, -- EP 696622  2/1996 Europe --.

Column 33,
Line 48, change "alkyd" to -- alkyl --;

Column 41,
Lines 20 and 21, change alklene" to -- alkylene --;

Signed and Sealed this

Sixth Day of November, 2001

Attest:

NICHOLAS P. GODICI
Attesting Officer    Acting Director of the United States Patent and Trademark Office